(12) United States Patent
Ochi et al.

(10) Patent No.: US 7,675,621 B2
(45) Date of Patent: Mar. 9, 2010

(54) TWO-DIMENSIONAL COLORIMETER, AND SPECTRAL SENSITIVITY CORRECTING METHOD

(75) Inventors: Keizou Ochi, Takatsuki (JP); Masao Nakamuro, Takarazuka (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 484 days.

(21) Appl. No.: 11/655,332

(22) Filed: Jan. 19, 2007

(65) Prior Publication Data

US 2007/0171421 A1 Jul. 26, 2007

(30) Foreign Application Priority Data

Jan. 20, 2006 (JP) ............................. 2006-012523

(51) Int. Cl.
*G01N 21/25* (2006.01)
(52) U.S. Cl. ..................................................... 356/406
(58) Field of Classification Search ................. 356/402, 356/406
See application file for complete search history.

(56) References Cited

U.S. PATENT DOCUMENTS

| | | | | |
|---|---|---|---|---|
| 4,989,982 A | * | 2/1991 | Osaki et al. ................. | 356/405 |
| 5,331,441 A | * | 7/1994 | Akuzawa et al. ............. | 358/530 |
| 6,072,526 A | * | 6/2000 | Hashimoto et al. ........ | 348/223.1 |
| 6,320,668 B1 | * | 11/2001 | Kim ............................ | 358/1.1 |
| 6,587,224 B1 | * | 7/2003 | Nabeshima et al. .......... | 358/1.9 |
| 6,697,522 B1 | * | 2/2004 | Ishikawa ..................... | 382/167 |

FOREIGN PATENT DOCUMENTS

JP 62-142239 A 6/1987

\* cited by examiner

*Primary Examiner*—Kara E Geisel
(74) *Attorney, Agent, or Firm*—Sidley Austin LLP

(57) ABSTRACT

A two-dimensional colorimeter includes: an image sensing section, having an image sensor constituted of a number of pixels arranged in a two-dimensional manner, for sensing an object image to be measured to acquire a two-dimensional image; a discriminator for discriminating whether a targeted color with respect to the two-dimensional image acquired by the image sensing section is to be corrected in terms of a pixel or pixels; and a calculator for performing a calculation to apply predetermined correction information corresponding to the color to be corrected to the two-dimensional image in terms of a pixel or pixels, based on a discrimination result by the discriminator.

16 Claims, 10 Drawing Sheets

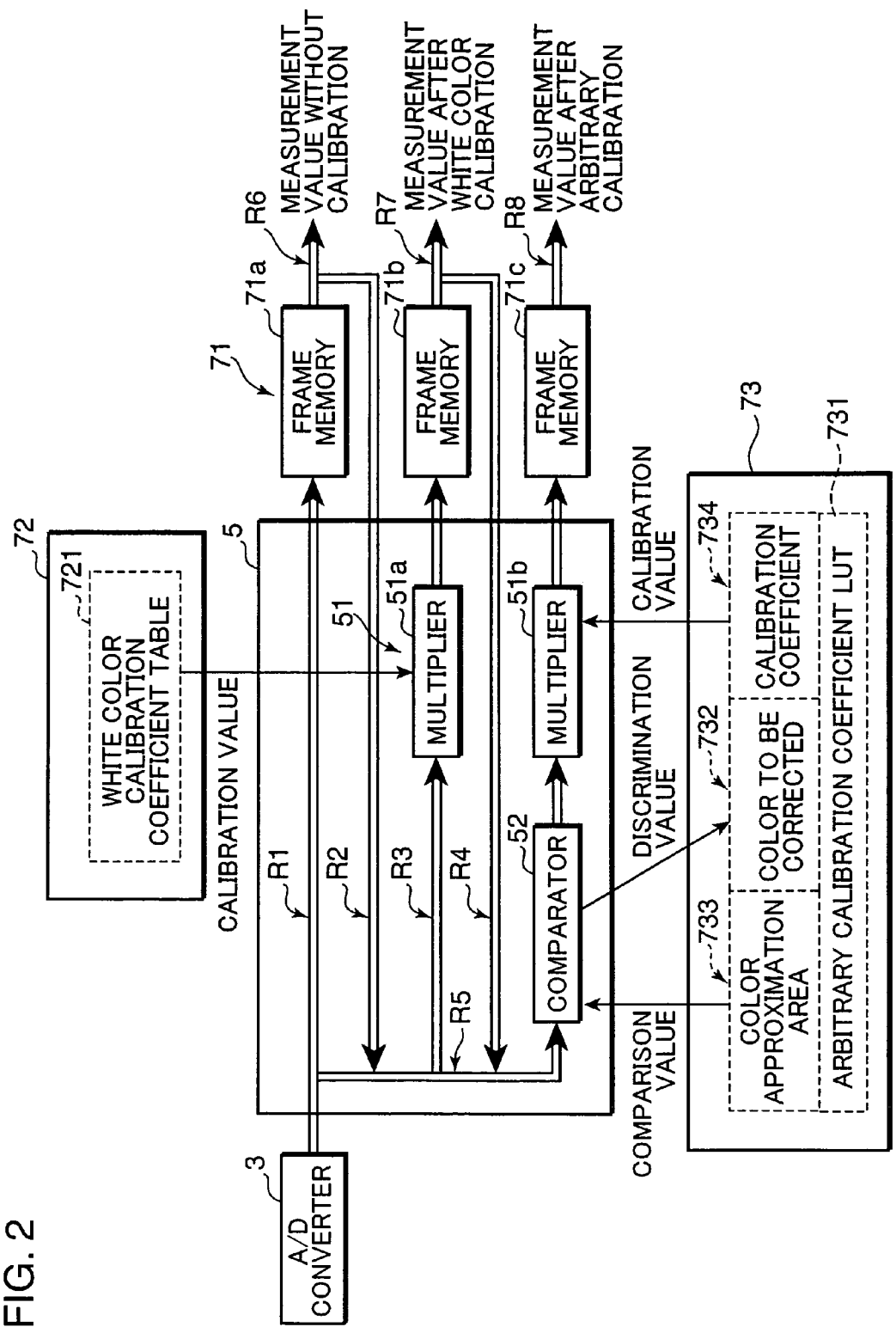

FIG. 3

CONSTRUCTION OF LUT ~731

| COLOR TO BE CORRECTED | MEASUREMENT RESULT (COLOR APPROXIMATION AREA) | CALIBRATION COEFFICIENT |
|---|---|---|
| A | $110-\alpha \leq X \leq 110+\alpha$<br>$100-\beta \leq Y \leq 100+\beta$<br>$90-\gamma \leq Z \leq 90+\gamma$ ~735 | $X \equiv \frac{100}{110}$<br>$Y \equiv \frac{100}{100}$<br>$Z \equiv \frac{100}{90}$ ~737 |
| B | $90-\alpha \leq X \leq 90+\alpha$<br>$45-\beta \leq Y \leq 45+\beta$<br>$90-\gamma \leq Z \leq 90+\gamma$ | $X \equiv \frac{100}{90}$<br>$Y \equiv \frac{50}{45}$<br>$Z \equiv \frac{80}{90}$ |
| C | $100-\alpha \leq X \leq 100+\alpha$<br>$100-\beta \leq Y \leq 100+\beta$<br>$100-\gamma \leq Z \leq 100+\gamma$ | $X \equiv \frac{110}{100}$<br>$Y \equiv \frac{100}{100}$<br>$Z \equiv \frac{90}{100}$ |
| ... ~732 | ... ~733 | ... ~734 |

BASE DATA FOR CALIBRATION COEFFICIENT DATA IN LUT

| MEASUREMENT VALUE CONCERNING COLOR TO BE CORRECTED | TRUE VALUE CONCERNING COLOR TO BE CORRECTED |
|---|---|
| 110<br>100 ~736<br>90 | 100<br>100 ~738<br>100 |
| 90<br>45<br>90 | 100<br>50<br>80 |
| 100<br>100<br>100 | 100<br>100<br>90 |
| ... ←M | ... ←T |

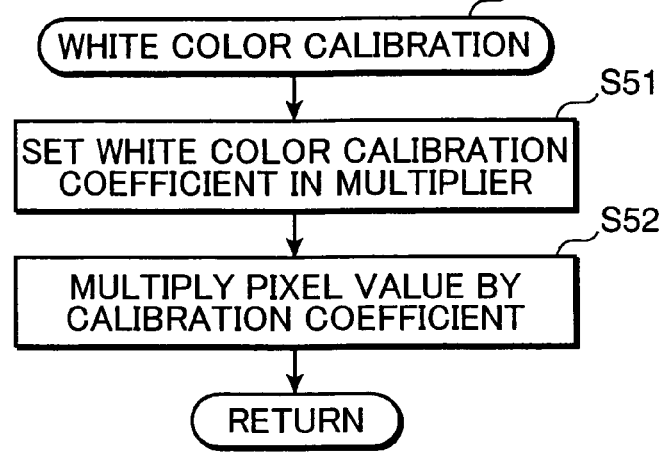
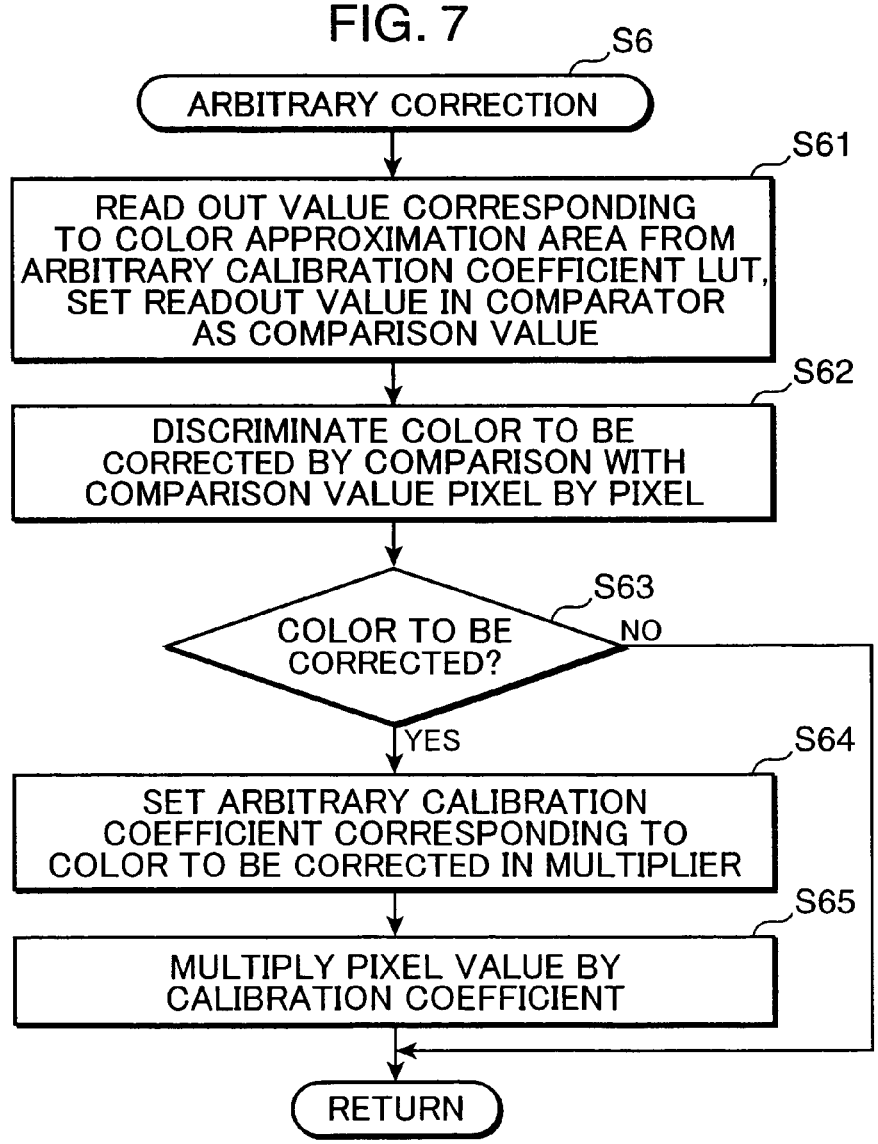

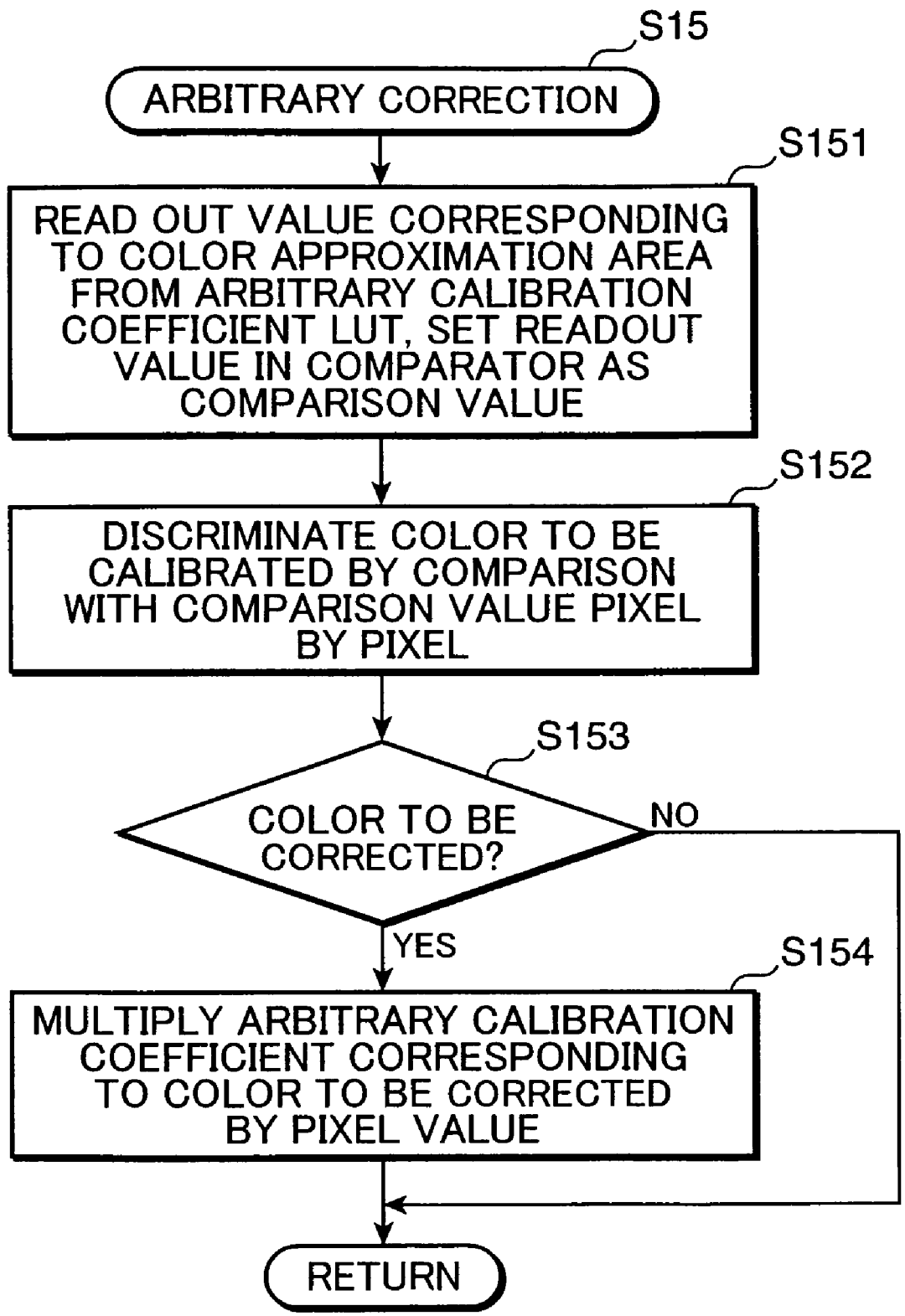

PRIOR ART
FIG. 11A
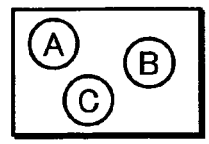
PRIOR ART
FIG. 11B
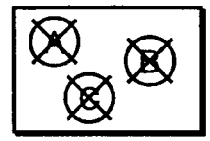
PRIOR ART
FIG. 11C
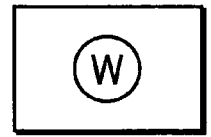
PRIOR ART
FIG. 11D
| IMAGE WHERE MEASUREMENT ERROR IS ELIMINATED IN COLOR IMAGE A | IMAGE WHERE MEASUREMENT ERROR IS ELIMINATED IN COLOR IMAGE B | IMAGE WHERE MEASUREMENT ERROR IS ELIMINATED IN COLOR IMAGE C |
|---|---|---|
| 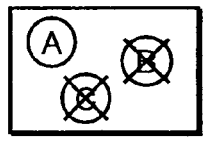 | 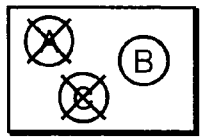 | 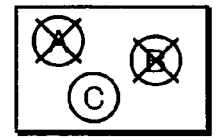 |

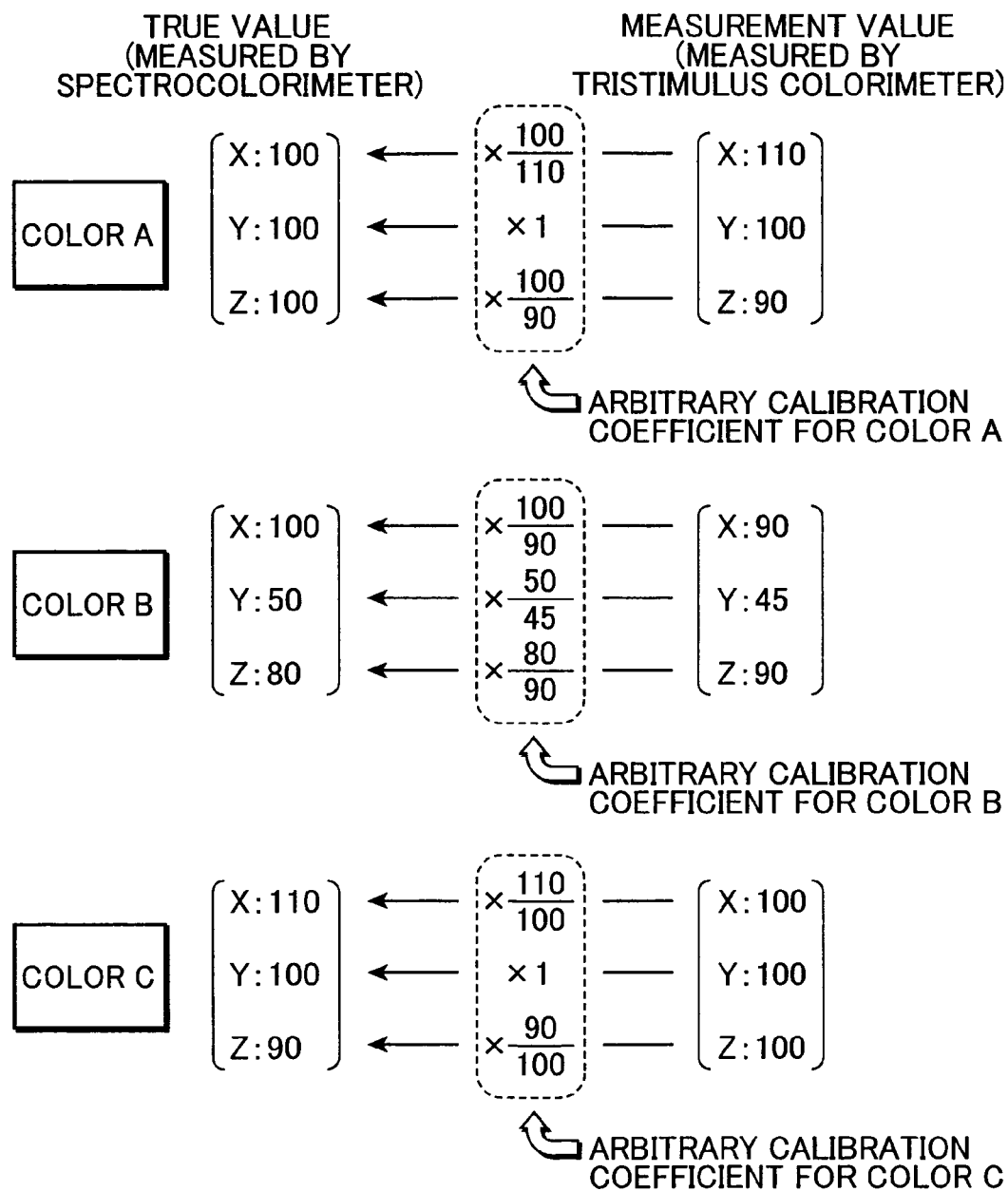

TWO-DIMENSIONAL COLORIMETER, AND SPECTRAL SENSITIVITY CORRECTING METHOD

This application is based on Japanese Patent Application No. 2006-12523 filed on Jan. 20, 2006, the contents of which are hereby incorporated by reference.

BACKGROUND OF THE INVENTION

1. Field of the Invention

The present invention relates to a two-dimensional colorimeter, and more particularly to a tristimulus two-dimensional colorimeter provided with a spectral sensitivity correction function.

2. Description of the Related Art

Heretofore, there have been used tristimulus two-dimensional calorimeters i.e. colorimeters for directly measuring tristimulus values using an optical filter such as an XYZ filter, or a like optical member, to measure luminance or chromaticity of a two-dimensional light source. Unlike a two-dimensional spectrocolorimeter, the tristimulus two-dimensional calorimeters have a characteristic that spectral sensitivities thereof do not completely match with a color matching function ($X(\lambda)$, $Y(\lambda)$, $Z(\lambda)$). Accordingly, the tristimulus two-dimensional colorimeters may have an error in measurement values resulting from mismatching between the spectral sensitivities and the color matching function. In other words, the tristimulus two-dimensional calorimeters fundamentally have a measurement error with respect to the color matching function. Also, there are performance differences among individual optical filters or like optical members for use in obtaining tristimulus values. Accordingly, a measurement error concerning the tristimulus two-dimensional colorimeters provided with the individual optical members may occur resulting from the optical member performance differences.

Let us assume that an object image having different colors e.g. colors A, B, and C arranged at respective different positions on a two-dimensional plane, for instance, as shown in FIG. 11A, is measured by a tristimulus two-dimensional colorimeter. In this case, as mentioned above, a measurement error may occur resulting from the mismatching between the spectral sensitivities and the color matching function, or the optical member performance differences (see FIG. 11B, in which "X" indicates a site where a measurement error has occurred concerning the relevant color). In the conventional art, correction i.e. white color calibration (see FIG. 11C) is performed to reduce the measurement error by calculating a calibration coefficient in such a manner that a measurement chromaticity value concerning an object as a calibration reference e.g. a white color (achromatic) light source W is approximated to its true value. In the conventional art, the calculated calibration coefficient is stored in advance, and the measurement value is corrected at the time of measurement, using the stored calibration coefficient.

In the aforementioned white color calibration, a chromaticity value of a color other than the white color may have a measurement error. In the case where a measurement value concerning e.g. the color A obtained by the tristimulus two-dimensional colorimeter is approximated to its true value in order to correct the measurement error, as shown in FIG. 12, the measurement value is corrected by: calculating a calibration coefficient, based on a correlation between the measurement value concerning the color A, and its true value i.e. a value having a high precision as an absolute value obtained by e.g. a spectrocolorimeter, for instance, calculating a calibration coefficient obtained as an inverse number of a ratio of a measurement value versus a true value, which corresponds to an arbitrary calibration coefficient shown in FIG. 12; and by multiplying the measurement value by the calibration coefficient. In the following, calibration of arbitrary colors i.e. colors arbitrarily selected by a user, including the colors B and C, in addition to the color A, is called as "arbitrary correction". An example of the arbitrary correction with respect to the colors B and C is also shown in FIG. 12. In the conventional arbitrary correction, however, a common arbitrary calibration coefficient is applied to the entirety of measurement results by a two-dimensional measurement. Accordingly, correction with respect to the color A may increase a difference between a measurement value and its true value concerning the colors B and C. As a result, an object image after the correction through visual observation may have different colors from those of an object image before the correction. The same drawback may occur in the case where correction is performed with respect to the color B or the color C, which may also increase a difference between the measurement value and the true value with respect to colors other than the color B or the color C (see FIG. 11D).

As mentioned above, in the case where there exist plural colors within a two-dimensional image to be measured (hereinafter, the image is called as "screen image" according to needs), a measurement error between the measurement value and the true value, resulting from mismatching with the color matching function or optical member performance differences, may occur with respect to the colors within the screen image. Also, since a measurement error characteristic with respect to the true value is different among the colors, even if a measurement error concerning a certain targeted color is corrected, a measurement error may remain concerning the colors other than the targeted color. In a worse case, a measurement error concerning the other colors may be increased. In view of this, it is necessary to correct the measurement errors by providing calibration coefficients individually for the colors to obtain measurement results with less measurement errors with respect to the entirety of the screen image. In the conventional art, however, a common calibration coefficient is applied to the entirety of the screen image, or calibration coefficients are switched over among individual areas within the screen image. The conventional art has no disclosure about an idea of applying optimal calibration coefficients to the colors individually within a common screen image.

In the conventional art, individual screen images are provided with respect to the respective corrected colors. In the above example, three images are formed with respect to the colors A, B, and C. This arrangement fails to apply correction results concerning the respective colors to a common screen image, which makes it impossible to obtain an image i.e. measurement results which are approximated to the respective true values with respect to the entirety of the two-dimensional measurement area. Also, in the case where the arbitrary correction is performed on a real-time basis each time a measurement is conducted, it is necessary to perform the measurement by the number of times equal to the number of colors for arbitrary correction, which may lower processing efficiency, in other words, may increase a measurement period, and may lower usability in operation i.e. operability. Further, in the case where measurement results i.e. image data obtained by an image sensing device are temporarily stored before an arbitrary correction is conducted, the measurement results are obtained by one-time measurement. However, as a post-process, arbitrary correction is required to be performed by the number of times equal to the number of colors for arbitrary correction, which may also lower processing efficiency and operability.

SUMMARY OF THE INVENTION

In view of the above problems residing in the conventional examples, it is an object of the present invention to provide a two-dimensional colorimeter with high processing efficiency and high operability, and a spectral sensitivity correcting method, which have the following features. The inventive two-dimensional colorimeter and the inventive spectral sensitivity correcting method are capable of: performing an arbitrary correction with respect to plural arbitrary colors within a common screen image obtained by a two-dimensional measurement i.e. a plane image sensing, while displaying measurement results concerning the respective colors after the arbitrary correction on the common screen image, in other words, applying measurement values concerning the respective colors after the correction to a single image; completing the arbitrary correction by one-time measurement i.e. one-time image sensing, in other words, obtaining image data i.e. measurement values after the arbitrary correction with respect to the colors by one-time measurement; and completing an arbitrary correction as a post-process by one-time operation, in the case where the arbitrary correction is performed after the measurement, without the need of performing the arbitrary correction by the number of times equal to the number of the colors for the arbitrary correction, in other words, completing the measurement in calibration to obtain arbitrary calibration coefficients by one-time operation.

A two-dimensional colorimeter according to an aspect of the invention comprises: an image sensing section, including an image sensor constituted of a number of pixels arranged in a two-dimensional manner, for sensing an object image to be measured to acquire a two-dimensional image; a discriminator for discriminating whether a targeted color with respect to the two-dimensional image acquired by the image sensing section is to be corrected in terms of a pixel or pixels; and a calculator for performing a calculation to apply predetermined correction information corresponding to the color to be corrected to the two-dimensional image in terms of a pixel or pixels, based on a discrimination result by the discriminator.

A spectral sensitivity correcting method according to another aspect of the invention comprises: sensing an object image to be measured to acquire a two-dimensional image; discriminating whether a targeted color with respect to the two-dimensional image acquired in the sensing step is to be corrected; and performing a calculation to apply predetermined correction information corresponding to the color to be corrected to the two-dimensional image in terms of a pixel or pixels, based on a discrimination result in the discriminating step.

These and other objects, features and advantages of the present invention will become more apparent upon reading the following detailed description along with the accompanying drawing.

BRIEF DESCRIPTION OF THE DRAWING

FIG. 2 is a block diagram for describing an example of an internal configuration of a digital computation processor in the two-dimensional calorimeter, and a flow on image data processing concerning an arbitrary correction.

FIG. 3 is a chart showing an example of an arbitrary calibration coefficient lookup table.

FIG. 6 is a flowchart showing an example of a white color calibration in Step S5 of the flowchart shown in FIG. 5.

FIG. 7 is a flowchart showing an example of an arbitrary correction in Step S6 of the flowchart shown in FIG. 5.

FIG. 10 is a flowchart showing an example of an arbitrary correction in Step S15 of the flowchart shown in FIG. 8.

FIGS. 11A through 11D are diagrams for describing a conventional arbitrary correction, wherein FIG. 11A is a diagram showing a certain two-dimensional image, and object sensing areas concerning colors A, B, and C within the two-dimensional image, FIG. 11B is a diagram showing a state that measurements values with respect to the object sensing areas concerning the colors A, B, and C have a measurement error, FIG. 11C is a diagram showing a state that calibration concerning a white color W is performed with respect to the two-dimensional image, and FIG. 11D shows states describing that measurement errors occur with respect to the other two colors, despite that correction is performed with respect to one of the colors A, B, C.

FIG. 12 is a diagram for describing an arbitrary correction method, and an arbitrary calibration coefficient calculation technique according to the conventional art.

DETAILED DESCRIPTION OF THE PREFERRED EMBODIMENTS

Figure 1:
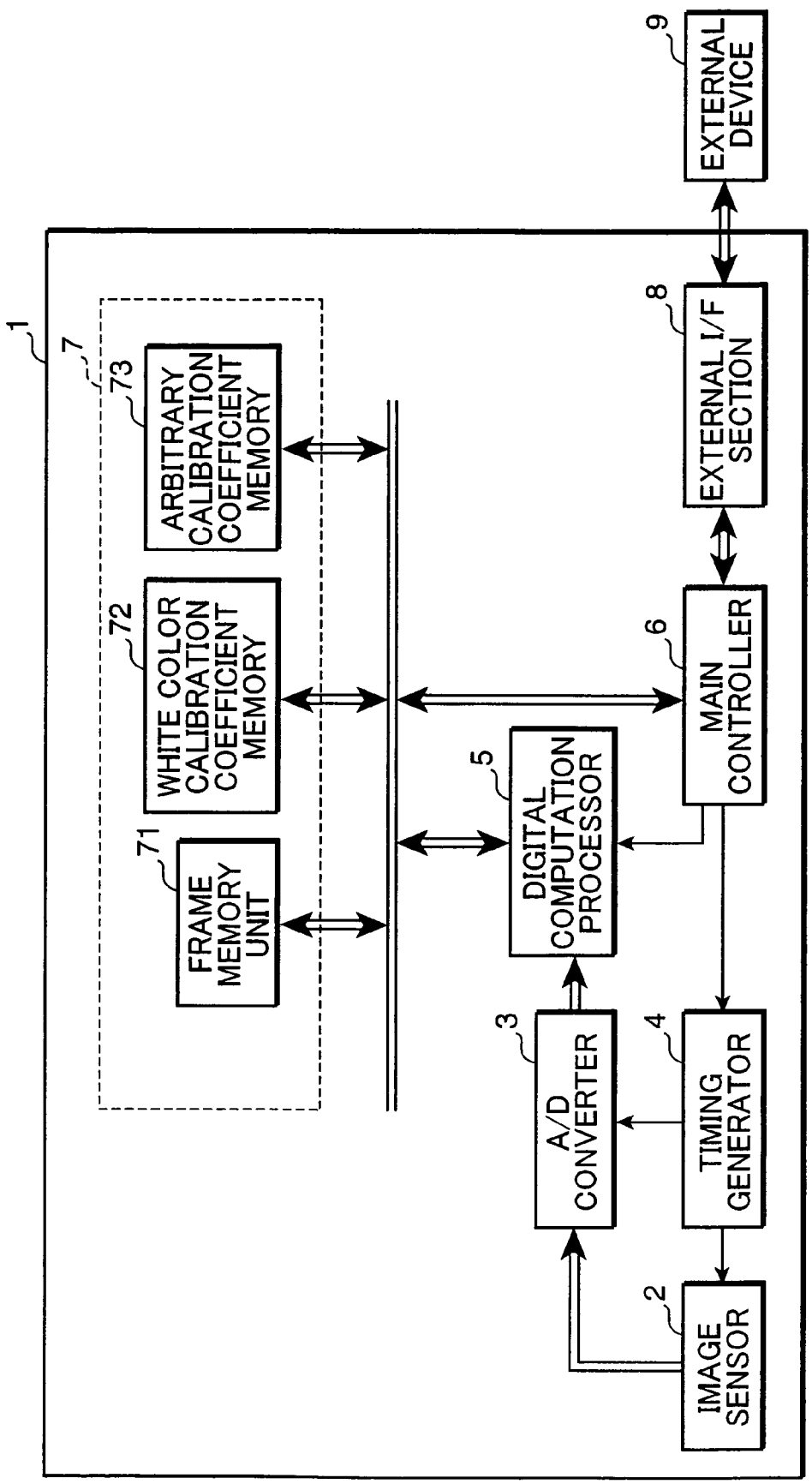
FIG. 1 is a block diagram showing an example of a two-dimensional colorimeter embodying the invention.

FIG. 1 is a block diagram showing an example of a two-dimensional colorimeter 1 embodying the invention. The two-dimensional calorimeter 1 is a tristimulus colorimeter equipped with a spectral sensitivity correction function. The two-dimensional colorimeter 1 includes an image sensor 2, an A/D converter 3, a timing generator 4, a digital computation processor 5, a main controller 6, a storage 7, and an external I/F section 8. The solid double lines with arrows in FIG. 1 represent flows of image data, and solid single lines with arrows in FIG. 1 represent flows of a control signal.

The image sensor 2 is adapted to acquire a tristimulus image, which is a two-dimensional image obtained by sensing an object light image, and which has information relating to tristimulus values. Specifically, the image sensor 2 includes X-, Y-, Z- filters (hereinafter called as an "XYZ filter") for acquiring tristimulus values (X, Y, Z), and a CCD image sensor which is based on an X-Y coordinate system and is capable of sensing a two-dimensional image. The image sensor 2 is configured in such a manner that sensing an object image through the XYZ filter, in other words, sensing an object image by a single monochromatic CCD image sensor by switching over the XYZ filter one after another, for instance, enables to obtain the aforementioned two-dimensional tristimulus image. The arrangement of the image sensor 2 is not limited to the above. As long as the two-dimensional tristimulus image is obtainable, any arrangement such as an arrangement of sensing an image, using three CCD image sensors respectively having an X-filter, a Y-filter, and a Z-filter, for instance, without the need of switching over the XYZ filter; and an arrangement of using R-, G-, B- filters i.e. an RGB filter, in place of the XYZ filter may be used. Hereinafter, an image which is a two-dimensional image and a tristimulus image is simply called as a "two-dimensional image". The image sensor 2 may be a CMOS image sensor, in place of the CCD image sensor.

The A/D converter 3 is adapted to convert an image signal i.e. an analog signal outputted from the image sensor 2 into an image signal of a digital value i.e. a digital signal. The A/D converter 3 converts each of pixel signals from the image sensor 2 into pixel data of e.g. 12 bits. The digital image data that has been analog-to-digitally converted by the A/D converter 3 is outputted to the digital computation processor 5, which will be described later.

The timing generator 4 generates a predetermined timing pulse e.g. a pixel driving signal, a horizontal synchronization signal, or a vertical synchronization signal, based on a sensing control signal outputted from the main controller 6, and controls a sensing operation of the image sensor 2 such as a charge accumulation operation based on light exposure, and an operation of reading out the accumulated charges, based on the timing pulse. The timing generator 4 also generates a clock for A/D conversion by the A/D converter 3.

The digital computation processor 5 includes an FPGA (Field Programmable Gate Array), and is adapted to perform image processing i.e. digital computation processing such as white calibration i.e. white balance correction, or arbitrary correction with respect to image data, which has been obtained by the sensing operation of the image sensor 2, and analog-to-digitally converted by the A/D converter 3, based on a computation control signal from the main controller 6. In particular, the digital computation processor 5 executes color discrimination, which will be described later, with respect to the image data in terms of a pixel unit for arbitrary correction, and executes computation such as multiplying a measurement value by predetermined correction information in accordance with a discrimination result. The computation processing method will be described later in detail. In the following, the two-dimensional image is also called as "two-dimensional measurement value" according to needs. Pixel values i.e. pixel data concerning the pixels constituting a two-dimensional image have color information in terms of tristimulus values, and accordingly, they are sometimes called as "chromaticity values" or measurement chromaticity values.

The main controller 6 includes an ROM (Read Only Memory) for storing control programs or the like, an RAM (Random Access Memory) for temporarily storing data for computation processing or control processing, and a CPU (Central Processing Unit) for reading out the control programs or the like from the ROM for execution. The main controller 6 controls overall operations of the two-dimensional colorimeter 1.

The storage 7 includes memories such as an ROM (Read Only Memory) and an RAM (Random Access Memory), and is adapted to store image data which has been outputted from the image sensor 2 via the digital computation processor 5 or the main controller 6, or image data which has been applied with a predetermined computation processing in the digital computation processor 5, or like data. The storage 7 has a frame memory unit 71, a white color calibration coefficient memory 72, and an arbitrary calibration coefficient memory 73. The frame memory unit 71 is adapted to store all pixel data concerning an image sensed by the image sensor 2, i.e. frame image data, or frame image data after an arbitrary correction. The white color calibration coefficient memory 72 is adapted to store information relating to white color calibration coefficients to be used in performing a white color calibration. In this embodiment, the white color calibration coefficient memory 72 stores a white color calibration coefficient table 721 in which the white color calibration coefficient information is recorded. The arbitrary calibration coefficient memory 73 stores information relating to arbitrary calibration coefficients to be used in performing an arbitrary correction, and stores an arbitrary calibration coefficient LUT (lookup table) 731 in which the arbitrary calibration coefficient information is recorded. The arbitrary calibration coefficient LUT 731 will be described later in detail.

The external I/F section 8 is an interface (I/F) for communicating data with an external device 9 i.e. an information processing device such as a PC (Personal Computer), which is configured to transmit information by being directly i.e. wiredly connected to the two-dimensional colorimeter 1 by way of a USB or a like device, or wirelessly connected thereto by way of a wireless LAN or a like device, or using a storage medium or a like device such as a memory card.

FIG. 2 is a block diagram for describing an example of an internal configuration of the digital computation processor 5, and a flow on image data processing concerning an arbitrary correction. Referring to FIG. 2, the digital computation processor 5 includes a multiplication unit 51 with multipliers 51a and 51b, and a comparator 52. The multiplication unit 51 multiplies a pixel value i.e. pixel data inputted to the multiplication unit 51 by a calibration coefficient. Specifically, the multiplier 51a multiplies a pixel value by a white color calibration coefficient recorded in the white color calibration coefficient table 721 stored in the white color calibration coefficient memory 72 i.e. calibration coefficient data for white color calibration, which corresponds to a tristimulus value (X, Y, Z). The multiplier 51b multiplies a pixel value by an arbitrary calibration coefficient recorded in the arbitrary calibration coefficient LUT 731 stored in the arbitrary calibration coefficient memory 73 i.e. calibration coefficient data, which is given with respect to each of predetermined arbitrary colors, and which corresponds to a tristimulus value (X, Y, Z). A specific chromaticity value concerning a white color to be used in the white color calibration is normally determined and given by a manufacturer of the calorimeter.

In the following, the arbitrary calibration coefficient LUT 731 is described in detail. FIG. 3 is a diagram showing an example of the arbitrary calibration coefficient LUT 731. The arbitrary calibration coefficient LUT 731 in FIG. 3 records therein, information relating to colors to be corrected, such as colors A, B, and C, as indicated by the reference numeral 732; information relating to ranges (hereinafter, called as "color approximation ranges"), as indicated by the reference numeral 733, within which targeted colors are approximated to their respective corresponding colors to be corrected, which correspond to pixel values (X, Y, Z), i.e. tristimulus values (X, Y, Z) included in the respective pixel data; and information relating to arbitrary calibration coefficients to be used, as indicated by the reference numeral 734, in correlation to the respective colors to be corrected. The color approximation ranges each may also be defined as a group of analogous colors having a predetermined range concerning a chromaticity value. In this sense, the color approximation ranges may also be called as chromaticity ranges.

The information 732 relating to the colors to be corrected i.e. the color information 732 may be information relating to colors themselves, or information indirectly representing colors. As far as the information 732 is capable of discriminating colors one from another, any information may be used. The color approximation range information 733 is information relating to ranges each obtained by adding or subtracting constants (hereinafter, called as "range constants"), as indicated by the symbols $\alpha$, $\beta$, $\gamma$, for determining the size of the color approximation range, to or from a measurement value, as indicated by the symbol M, concerning the color to be corrected. Specifically, a color approximation range with respect to the color A, as indicated by the reference numeral 735, satisfies mathematical expressions: $110-\alpha \leq X \leq 110+\alpha$, $100-\beta \leq Y \leq 100+\beta$, $90-\gamma \leq Z \leq 90+\gamma$ where the range constants $\alpha$, $\beta$, $\gamma$ are added or subtracted to or from measurement values indicated by the reference numeral 736 i.e. X=110, Y=100, Z=90, which correspond to luminance information concerning light that have been obtained through the XYZ filter, respectively. Color approximation ranges concerning the other colors are defined in the similar manner as mentioned above. More specifically, the pixel value (X, Y, Z) which satisfies the color approximation range 735 is regarded as a pixel value corresponding to the color A, in other words, is approximated. This eliminates the need of preparing calibration coefficients by the number equal to the number of pixel units corresponding to all the pixel data constituting a two-dimensional image, which increases processing efficiency. Also, properly adjusting the color approximation range i.e. the range constants $\alpha$, $\beta$, $\gamma$ enables to properly adjust a color approximation range concerning an arbitrary color to be corrected, which leads to improved correction precision with respect to the color to be corrected. In this embodiment, the range constants $\alpha$, $\beta$, $\gamma$ are identical among the colors to be corrected i.e. among the respective pixel values (X, Y, Z). Alternatively, the range constants $\alpha$, $\beta$, $\gamma$ may be individually defined with respect to the colors to be corrected.

A value defined as a true value is determined by multiplying the measurement value by the arbitrary calibration coefficient, as indicated by the reference numeral 734, in the similar manner as described referring to FIG. 12, based on the measurement value concerning the color to be corrected, as indicated by the symbol M, and the true value concerning the color to be corrected, as indicated by the symbol T. For instance, an arbitrary calibration coefficient, as indicated by the reference numeral 737, with respect to the pixel value (X, Y, Z) concerning the color A is expressed by "true value/measurement value", using the measurement value indicated by the reference numeral 736 and the true value indicated by the reference numeral 738, in other words, X:100/110, Y:100/100, Z:100/90 where "/" represents division. Arbitrary calibration coefficients concerning the other colors are determined in the similar manner as mentioned above.

Referring back to FIG. 2, the comparator 52 compares a pixel value outputted to the comparator 52, with the information recorded in the arbitrary calibration coefficient LUT 731. Specifically, the comparator 52 retrieves the color approximation range information 733, as a "comparison value" in FIG. 2, from the arbitrary calibration coefficient LUT 731, compares the retrieved color approximation range information 733 with the pixel value, and discriminates whether the pixel value lies within any one of the color approximation ranges corresponding to the colors to be corrected. The digital computation processor 5 reads out the arbitrary calibration coefficient corresponding to the targeted color, as a "calibration value" in FIG. 2, from the arbitrary calibration coefficient LUT 731, based on a discrimination result by the comparator 52, i.e. based on a "discrimination value" in FIG. 2, which is information relating to the color to be corrected, and corresponds to the pixel value. Then, the multiplier 51b multiplies the arbitrary calibration coefficient by the pixel value.

In the above arrangement, one frame image data i.e. measurement values, in other words, pixel data corresponding to all the pixels constituting a two-dimensional image, which have been read out from the image sensor 2 i.e. outputted from the A/D converter 3, are temporarily stored or buffered in a frame memory 71a via a signal path R1. The image data stored in the frame memory 71a are sequentially outputted to the multiplier 51a, pixel by pixel i.e. pixel data by pixel data, via signal paths R2, R5, and R3. Upon receiving the respective pixel data, the multiplier 51a retrieves a white color calibration coefficient indicated by a "calibration value" in FIG. 2 from the white color calibration coefficient memory 72, and multiplies the inputted pixel data i.e. the pixel value by the white color calibration coefficient. Thereby, pixel data i.e. a measurement value after the white color calibration is stored in a frame memory 71b. The pixel data stored in the frame memory 71b is, then, outputted to the comparator 52 via a signal path R4, and the signal path R5. Then, the comparator 52 is operative to compare the pixel data after the white color calibration, with the corresponding data recorded in the arbitrary calibration coefficient LUT 731 to discriminate the color to be corrected corresponding to the pixel data, in other words, to select the arbitrary calibration coefficient corresponding to the color to be corrected from the arbitrary calibration coefficients, which correspond to the respective colors to be corrected. The arbitrary calibration coefficients are stored in the arbitrary calibration coefficient memory 73. Then, the multiplier 51b multiplies the pixel data by the arbitrary calibration coefficient with respect to the color to be corrected, which has been discriminated i.e. selected by the discrimination. Thereafter, the pixel data after the arbitrary correction is stored in a frame memory 71c.

The frame memories 71a, 71b, and 71c are partial frame memories in the frame memory unit 71 in FIG. 1, corresponding to areas for storing image data before correction e.g. raw image data, image dater after the white color calibration, and image data after the arbitrary correction, respectively. The memory configuration is not limited to the above. Alternatively, the frame memories 71a, 71b, and 71c may constitute a single frame memory 71 i.e. a single memory device. In the altered arrangement, for instance, after pixel data is read out from the frame memory 71 for computation, using an FIFO (First-In First-Out) system, the pixel data after the readout processing is written in the frame memory 71, and the reading and the writing operations are cyclically repeated to execute the aforementioned processing.

The white color calibration is a calibration to reduce an error in measurement values with respect to a predetermined white color. Normally, a measuring device such as a colorimeter is equipped with the white color calibration function as a default calibration. In this embodiment, the two-dimensional colorimeter is equipped with the white color calibration function, and the arbitrary correction is performed after the white color calibration. Alternatively, the white color calibration function may be omitted, in other words, the white color calibration may not be performed. In the altered arrangement, image data outputted from the A/D converter 3 is buffered in the frame memory 71a, and then is directly outputted to the comparator 52 via the signal paths R2 and R5 without being transmitted to the multiplier 51a i.e. without en route the signal paths R3 and R4. Alternatively, the image data may not be necessarily temporarily buffered in the frame memory 71a. In the altered arrangement, arbitrary correction is performed while sequentially reading out pixel data, in other words, the respective pixel data are directly outputted from the A/D converter 3 to the comparator 52 via the signal path R5. Likewise, in performing the white color calibration, pixel data may be directly outputted from the A/D converter 3 to the multiplier 51a via the signal paths R5 and R3, in place of being buffered into the frame memory 71a.

In the calibration processing, data may be read out from the frame memories 71a, 71b, and 71c of the frame memory unit 71 in the course of the calibration processing i.e. via signal paths R6, R7, and R8, respectively, to acquire "a measurement value without calibration" or "a measurement value after white color calibration", as interim data. Further alternatively, the default calibration may be a calibration other than the white color calibration, in other words, a color other than the white color may be used as a reference color to be corrected.

Figure 5:
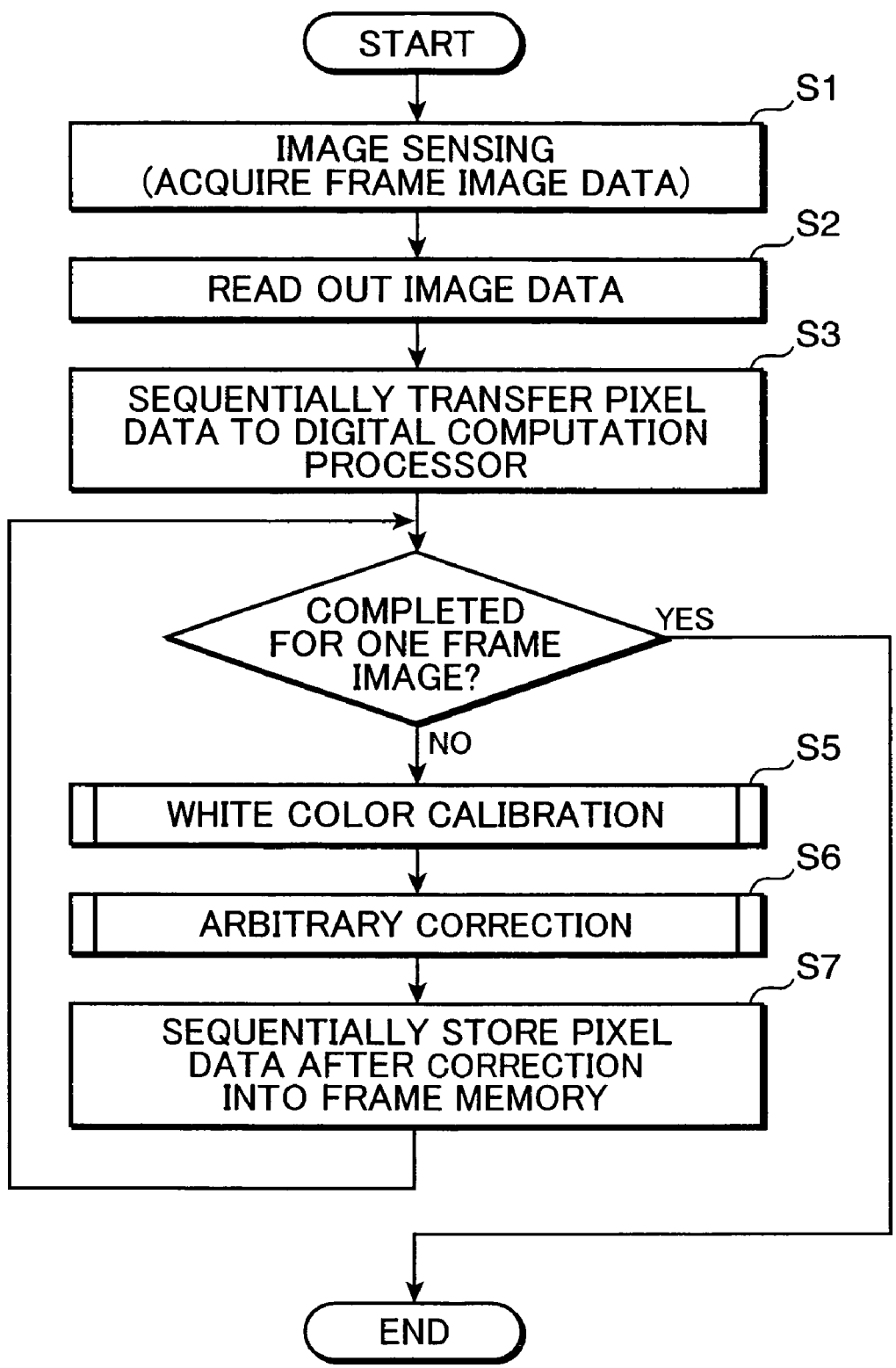
FIG. 5 is a flowchart showing an example of an operation concerning the arbitrary correction to be executed by the two-dimensional colorimeter in the embodiment.

FIG. 5 is a flowchart showing an example of an operation concerning the arbitrary correction to be executed by the two-dimensional colorimeter 1 in the embodiment. First, an image is sensed by the image sensor 2 to acquire one frame image data. Specifically, a series of sensing operations comprising: resetting or sweeping out previously accumulated electric charges; accumulating electric charges by photoelectric conversion by a PD (photodiodes); and transferring the electric charges accumulated by the PD to a vertical transfer path (VCCD) is conducted (Step S1). Thereafter, the image data obtained by the image sensing operation is read out. Specifically, pixel data are sequentially outputted from the image sensor 2 by alternately performing vertical charge transfer (VCCD) and horizontal charge transfer (HCCD) (Step S2). The pixel data outputted from the image sensor 2 are sequentially outputted i.e. transferred to the digital computation processor 5 (Step S3).

In the case where pixel data output to the digital computation processor 5 i.e. processing with respect to pixel data is not completed with respect to all the pixel data constituting one frame image (NO in Step S4), white color calibration (Step S5) and arbitrary correction (Step S6) are performed sequentially with respect to each of the pixel data i.e. pixel data by pixel data to sequentially store the pixel data after the correction into the frame memory unit 71 (Step S7). Thereafter, the flow returns to Step S4, and, then, the white color calibration and the arbitrary correction i.e. the respective corrections are performed with respect to the next pixel data. This operation is cyclically repeated until the respective corrections are completed with respect to all the pixel data constituting the one frame image. In Step S4, if the respective corrections are completed with respect to all the pixel data (YES in Step S4), the flow ends. As an altered form, after YES in Step S4, the frame image data after the white color calibration and the arbitrary correction, which is stored in the frame memory unit 71, may be transferred to the external device 9 via the external I/F section 8 to apply a predetermined processing to the frame image data.

FIG. 6 is a flowchart showing an example of the white color calibration in Step S5 in the flowchart of FIG. 5. In the white color calibration, a white color calibration coefficient is read out from the white color calibration coefficient memory 72, and outputted to the multiplier 51a (Step S51). Then, the multiplier 51a multiplies the white color calibration coefficient by the pixel data i.e. the pixel value which has been outputted to the multiplier 51a (Step S52). Then, the flow returns to Step S5. In the case where the white color calibration function is not provided in the two-dimensional colorimeter 1, as mentioned above, Step S5 i.e. the flowchart of FIG. 6 is eliminated from the flowchart of FIG. 5.

FIG. 7 is a flowchart showing an example of the arbitrary correction in Step S6 in the flowchart of FIG. 5. First, a value in a color approximation range for discriminating whether the targeted color is a color to be corrected is read out from the arbitrary calibration coefficient LUT 731 stored in the arbitrary calibration coefficient memory 73, and the readout value is outputted to the comparator 52, as a comparison value (Step S61). Then, the comparator 52 compares the pixel value i.e. a tristimulus value (X, Y, Z) as a measurement value, with the comparison value i.e. the color approximation range information concerning the tristimulus value (X, Y, Z) shown in FIG. 3 to discriminate whether the targeted color is the color to be corrected. In other words, the comparator 52 determines that the targeted pixel value belongs to any one of the color approximation ranges corresponding to the colors to be corrected, or determines that the targeted pixel value does not belong to any one of the color approximation ranges (Step S62).

In the case where the comparator 52 determines that the targeted pixel value belongs to a certain color approximation range, in other words, the targeted pixel value is a pixel value corresponding to a color to be corrected (YES in Step S63), the arbitrary calibration coefficient corresponding to the color to be corrected is read out i.e. selected from the arbitrary calibration coefficient LUT 731 stored in the arbitrary calibration coefficient memory 73 for outputting the selected arbitrary calibration coefficient to the multiplier 51b (Step S64). Then, the multiplier 51b multiplies the arbitrary calibration coefficient by the pixel data inputted to the multiplier 51b (Step S65). In Step S63, if the comparator 52 determines that the targeted pixel value does not belong to any one of the color approximation ranges, in other words, the targeted pixel is a pixel value having no counterpart color to be corrected (NO in Step S63), the flow returns to Step S6, without executing the process of multiplying the pixel value by the arbitrary calibration coefficient in Steps S64 and S65.

Figure 4:
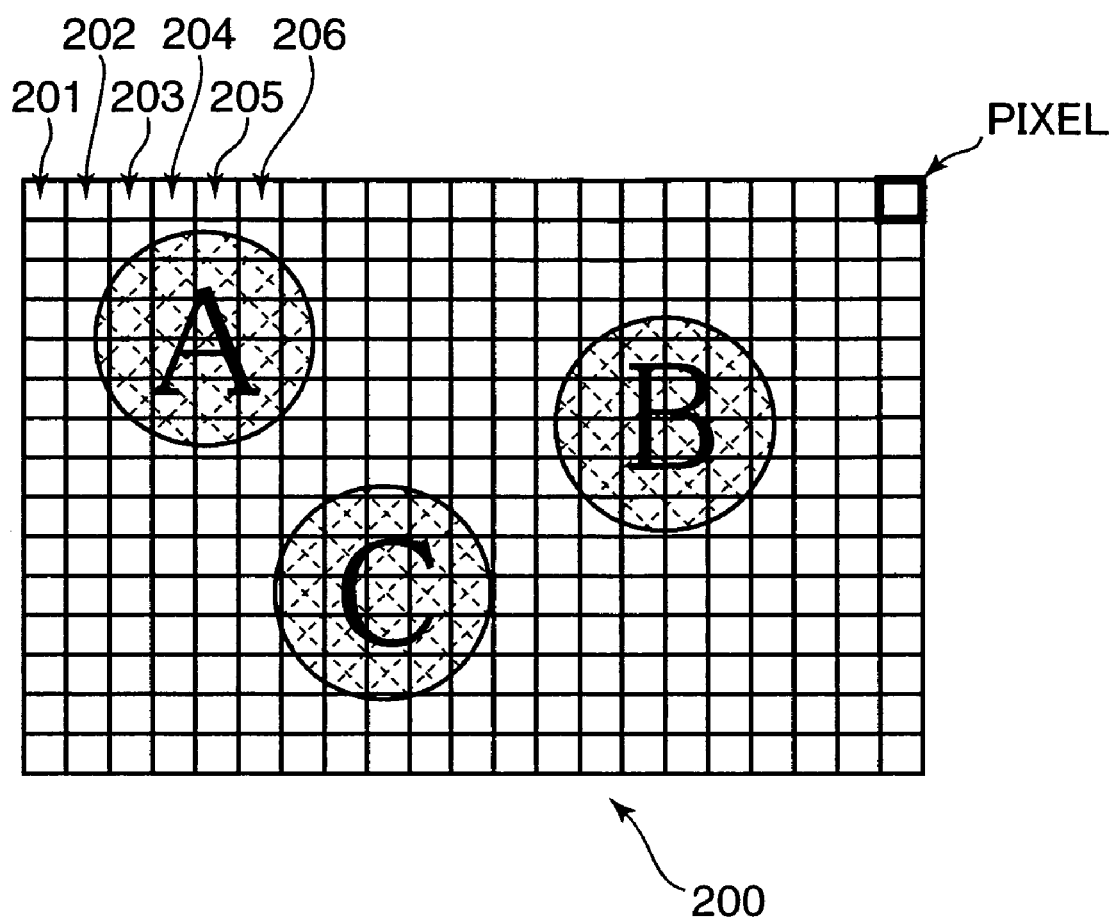
FIG. 4 is a conceptual diagram of a two-dimensional image for describing an arbitrary correction technique in the embodiment.

In the above arrangement, as shown in FIG. 4, concerning pixel data arranged in a two-dimensional manner i.e. the entirety of a two-dimensional image 200, as measurement results, discrimination can be made as to whether a targeted pixel value belongs to a targeted color to be corrected, pixel by pixel i.e. in terms of a pixel unit, concerning the arbitrary colors A, B, C, . . . shown in FIG. 4; and arbitrary correction concerning the targeted color to be corrected can be performed pixel by pixel if the targeted pixel value is discriminated to belong to the targeted color to be corrected. This enables to perform corrections with respect to the plural arbitrary colors simultaneously on a common screen image i.e. a single screen image i.e. the two-dimensional image 200. FIG. 4 conceptually shows areas covered by the respective colors within the two-dimensional image 200. The arbitrary correction is also called as "multi-point simultaneous arbitrary correction". The multi-point simultaneous arbitrary correction may be executed after the default calibration e.g. the white color calibration.

In the above arrangement, a calibration coefficient with respect to a predetermined arbitrary color is applied individually pixel by pixel, unlike the conventional arrangement that a common calibration coefficient is applied to a common screen image. This arrangement enables to obtain an image i.e. two-dimensional measurement result, in which optimal corrections are performed individually with respect to the plural arbitrary colors within a single screen image. Also, the measurement result is processed pixel by pixel while discriminating the colors one from another. This enables to complete the correction by one-time measurement in the case where the correction is performed simultaneously with the measurement. In the case where a correction is performed as a post process after the measurement, the correction is completed by one-time operation. In both of the cases, a two-dimensional calorimeter with a shortened processing period i.e. with improved processing efficiency and improved operability can be realized. The above arrangement enables to automatically discriminate whether data concerning targeted colors to be corrected is included in the measurement results by designating the colors to be corrected in advance. This is also advantageous in performing a correction efficiently, without the need of designating colors to be corrected by a user, each time the two-dimensional colorimeter is used.

The expression "pixel by pixel" includes not only a case that pixels adjacent to each other e.g. pixels 201, 202, 203, . . . in FIG. 4 are handled sequentially one by one, but also a case that pixels at every other predetermined number e.g. pixels 201, 203, and 205 are handled, and a case that pixels are handled in terms of a pixel value in a certain pixel area, which is obtained by implementing a predetermined processing e.g. an averaging processing with respect to a pixel area each constituting a certain number of pixels e.g. a pixel area constituting pixels 201, 202, and 203, or a pixel area constituting pixels 204, 205, and 206. In any case, the processing is implemented individually in terms of pixel units, in place of processing with respect to all the pixels within the screen image 200.

As mentioned above, the correction information represented by the arbitrary calibration coefficient LUT 731 is used in performing the arbitrary correction. Alternatively, the correction information may be obtained by a calibration of calculating the correction information. In the altered arrangement, for instance, a table information generator (not shown) may be provided in the external device 9 so that an arbitrary calibration coefficient LUT is generated by the table information generator when the two-dimensional colorimeter 1 is in the calibration mode, and that the external device 9 is operative to send a calibration result i.e. the arbitrary calibration coefficient LUT to the two-dimensional calorimeter 1 for writing the arbitrary calibration coefficient LUT into the arbitrary calibration coefficient memory 73 provided in the two-dimensional calorimeter 1.

To implement the calibration, for instance, first, a two-dimensional image for calibration is acquired in advance by e.g. sensing an image by the image sensor 2 prior to executing the arbitrary correction, for storing the two-dimensional image into the external device 9. Then, the acquired two-dimensional image is displayed on a monitor screen e.g. an LCD (Liquid Crystal Display) of the external device 9. The user, then, designates an intended site, on the displayed two-dimensional image on the monitor screen, i.e. a pixel point or a pixel area constituting a certain number of pixels where the user wishes to obtain a color measurement value of high precision, with use of an input device such as a mouse or a pointing pen. In response to the user's designation, the table information generator or a like device is operative to acquire a chromaticity value at the designated site, which corresponds to the measurement value, as indicated by the reference numeral 736 in FIG. 3. The chromaticity value includes a chromaticity value at one pixel point, and a chromaticity average value or an equivalent value obtained by averaging the pixel values within the pixel area. Also, in response to the user's designation, a window for allowing the user to input information i.e. an information entry window box is displayed at a site, corresponding to the designated site, on the monitor screen of the external device 9. The user is allowed to enter, through the information entry window box, the name of the color to be corrected at the designated site, as indicated by the reference numeral 732 within the arbitrary calibration coefficient LUT 731 (see FIG. 3). The name of the color to be entered is arbitrarily set by the user.

Also, a chromaticity value at a site within the two-dimensional image, which corresponds to the designated site, is measured, using a spectrocolorimeter capable of performing high precision measurement i.e. obtaining measurement precision as an absolute value. The chromaticity value is acquired as a "true value", which corresponds to the true value, as indicated by the reference numeral 738 in FIG. 3. The user enters the true value through the information entry window box. In this way, when the two-dimensional colorimeter 1 is in the calibration mode, the user designates a site where the user wishes to perform an arbitrary correction within the screen image, enters the name of the color to be corrected at the designated site, and enters the true value, at the designated site, which is obtained by the measurement with respect to the color to be corrected by the measuring device other than the two-dimensional calorimeter. With this arrangement, the table information generator is operative to calculate an arbitrary calibration coefficient corresponding to the color to be corrected by obtaining a ratio of the measurement value i.e. a chromaticity value or a chromaticity average value versus the true value. The calculated arbitrary calibration coefficients are correlated to each of the colors to be corrected, which have been entered by the user. Color approximation ranges corresponding to the colors to be corrected are set, using the information relating to the range constants $\alpha$, $\beta$, $\gamma$, which have been predefined and stored. The information relating to the calibration coefficients, the colors to be corrected, and the color approximation ranges are automatically created in terms of an LUT. This arrangement allows the user to designate plural arbitrary colors all at once with respect to a single two-dimensional image, whereas, in the conventional arrangement, it is necessary to acquire plural images concerning plural arbitrary colors, and to designate colors individually with respect to the images. The above arrangement in the embodiment facilitates creation of an arbitrary calibration coefficient LUT i.e. a calibration operation, which improves operation efficiency i.e. processing efficiency, and operability in the arbitrary correction. The arbitrary calibration coefficient LUT may be created by the two-dimensional colorimeter 1, in place of using the external device 9. In other words, the calibration function may be provided in the two-dimensional calorimeter 1, or an arbitrary calibration coefficient LUT may be created by the external device 9 and based on a measurement to be executed by a measuring device other than the two-dimensional calorimeter 1.

Figure 8:
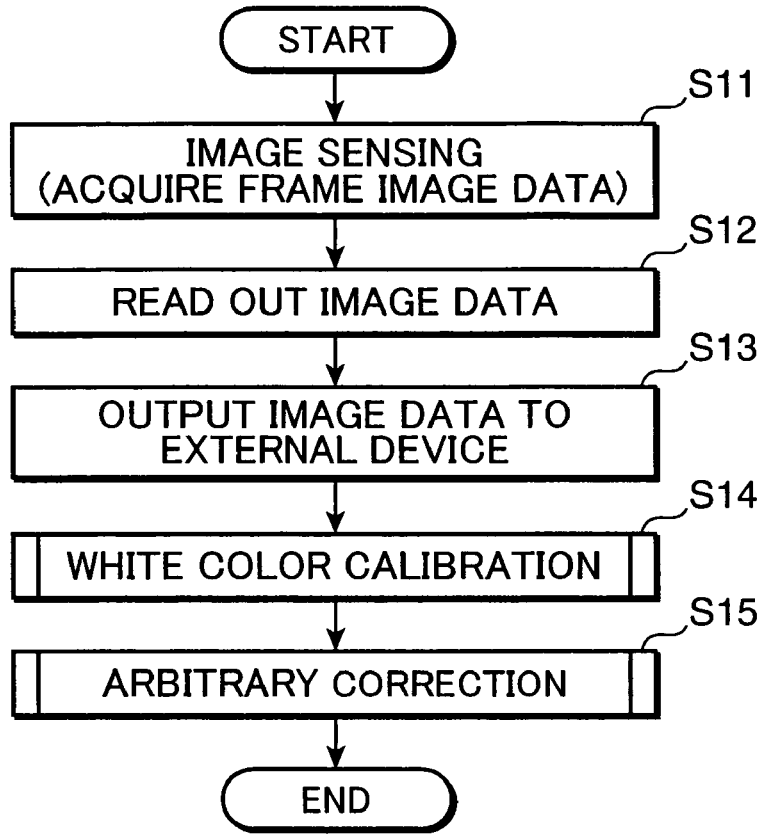
FIG. 8 is a flowchart showing an operation to be executed in the case where the arbitrary correction is executed by an external device.

In the embodiment, the computation processing is implemented primarily by the measuring device i.e. the two-dimensional calorimeter 1 as a hardware configuration. Alternatively, the computation processing may be implemented primarily by the external device 9 as a software configuration after a measurement result before correction is outputted to the external device 9 without processing. It should be noted that, similarly to the embodiment, the external device 9 is included in the two-dimensional colorimeter 1 in the altered arrangement. In the altered arrangement, as shown in the flowchart of FIG. 8, for instance, similarly to Steps S1 and S2 in FIG. 5, first, one frame image data is acquired by sensing an image by the image sensor 2, and the frame image data is read out from the image sensor 2 for sequential storage into the frame memory unit 71 (Steps S11 and S12). Then, the readout image data is transferred to the external device 9 via the external I/F section 8 (Step S13). Thereafter, white color calibration and arbitrary correction are performed by the external device 9 (Steps S14 and S15).

Figure 9:
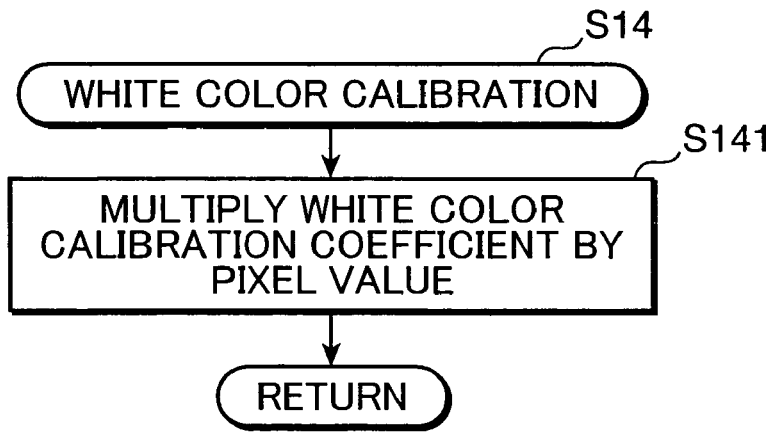
FIG. 9 is a flowchart showing an example of a white color calibration in Step S14 of the flowchart shown in FIG. 8.

Referring to the flowchart of FIG. 9, for instance, in the white color calibration in Step S14, a computation processor (not shown) provided e.g. in the external device 9 multiplies a white color calibration coefficient by the pixel data i.e. the pixel value outputted to the external device 9 (Step S141). The white color calibration coefficient may be a value that is stored in the white color calibration coefficient memory 72 in the two-dimensional colorimeter 1, or a value that is stored in a white color calibration coefficient memory provided in the external device 9. In executing the computation processing by the external device 9, similarly to the arrangement in the foregoing embodiment, the white color calibration may be omitted. In the altered arrangement, the flowchart of FIG. 8 does not include Step S14, as in the case of the embodiment. Concerning the white color calibration to be executed before the arbitrary correction in the altered arrangement, an arbitrary color other than the white color may be used, as in the case of the embodiment.

Referring to the flowchart of FIG. 10, for instance, in the arbitrary correction in Step S15, first, a value in the color approximation range for discriminating whether the targeted color is a color to be corrected is read out from the arbitrary calibration coefficient LUT created by the table information generator, and the readout value is outputted to the computation processor, as a comparison value (Step S151). The value in the color approximation range may be a value that has been created and stored before arbitrary correction is conducted. Then, the computation processor compares the pixel value i.e. a tristimulus value (X, Y, Z) as a measurement value, with the comparison value, pixel by pixel, to discriminate whether the targeted color is the color to be corrected (Step S152). In the case where the computation processor discriminates that the targeted pixel value belongs to a certain color approximation range, in other words, the targeted pixel value is a pixel value corresponding to a color to be corrected (YES in Step S153), the arbitrary calibration coefficient corresponding to the color to be corrected is read out from the arbitrary calibration coefficient LUT, and then, the arbitrary calibration coefficient is multiplied by the pixel value outputted to the external device 9 (Step S154). In Step S153, if the computation processor discriminates that the targeted pixel value does not belong to any one of the color approximation ranges, in other words, the targeted pixel is a pixel value having no counterpart color to be corrected (NO in Step S153), the flow returns to Step S15, without executing the process of multiplying the pixel value by the arbitrary calibration coefficient in Step S154.

In the two-dimensional colorimeter 1 recited in the embodiment, the image sensor 2 corresponding to an image sensing section with an image sensor senses an object image to be measured to acquire a two-dimensional image, and the comparator 52 corresponding to a discriminator discriminates whether a targeted color with respect to the two-dimensional image acquired by the image sensor 2 is to be corrected in terms of a pixel unit. Then, the multiplier 51b corresponding to a calculator performs a calculation to apply predetermined correction information corresponding to the color to be corrected to the two-dimensional image in terms of a pixel unit, based on a discrimination result by the comparator 52.

In the above arrangement, the colors on the two-dimensional image are discriminated one from another in terms of a pixel unit. Hereinafter, the discrimination is called as color discrimination according to needs. In the case where it is discriminated that data concerning e.g. a certain pixel unit is data having information relating to a certain color to be corrected, based on the discrimination result, the correction information e.g. a calibration coefficient corresponding to the color to be corrected is applied to the pixel unit data. This enables to realize the two-dimensional colorimeter 1, having high processing efficiency and high operability, which is capable of: performing an arbitrary correction with respect to plural arbitrary colors to be corrected within a common screen image i.e. the two-dimensional image, while displaying measurement results concerning the respective colors after the arbitrary correction on the common screen image, in other words, applying measurement values concerning the respective colors after the correction to a single image; completing the arbitrary correction by one-time measurement i.e. one-time image sensing in performing the arbitrary correction, in other words, obtaining an image i.e. measurement values after the arbitrary correction with respect to the colors by one-time measurement; and completing an arbitrary correction as a post-process by one-time operation, in the case where the arbitrary correction is performed after the measurement, without the need of performing the arbitrary correction by the number of times equal to the number of the colors for the arbitrary correction, in other words, completing the measurement in calibration to obtain arbitrary calibration coefficients by one-time operation.

The arbitrary calibration coefficient memory 73 corresponding to a storage stores therein discrimination chromaticity values corresponding to the colors to be corrected i.e. the color approximation ranges indicated by the reference numeral 733 in FIG. 3, and the calibration coefficients indicated by the reference numeral 734 in FIG. 3, as the correction information, in correlation to each other. The comparator 52 compares measurement chromaticity values as chromaticity values on the two-dimensional image acquired by the image sensor 2 in terms of a pixel unit, with the discrimination chromaticity values i.e. the color approximation ranges stored in the arbitrary calibration coefficient memory 73. Then, the multiplier 51b selects the calibration coefficient corresponding to the color to be corrected from the calibration coefficients stored in the arbitrary calibration coefficient memory 73 in accordance with a comparison result by the comparator 52 to multiply the selected calibration coefficient by the respective corresponding measurement chromaticity values.

In the above arrangement, a comparison is made between the measurement chromaticity values and the discrimination chromaticity values concerning the two-dimensional image in terms of a pixel unit, and the calibration coefficient corresponding to the color to be corrected, which is selected in accordance with the comparison result, is multiplied by the respective corresponding measurement chromaticity values. This enables to easily realize an arrangement that the colors on the two-dimensional image are discriminated one from another in terms of a pixel unit, and that the correction information corresponding to the color to be corrected is applied to the two-dimensional image in terms of a pixel unit, thereby providing the two-dimensional colorimeter 1 with high processing efficiency and operability.

The discrimination chromaticity values are information relating to chromaticity ranges i.e. the color approximation ranges each having a predetermined range concerning the chromaticity value. This enables to handle the measurement chromaticity values, on the two-dimensional image, which belong to a certain chromaticity range, as the same color to be corrected in color discrimination, i.e., to apply the same calibration coefficient to the measurement chromaticity values within the certain chromaticity range. In other words, since a certain color to be corrected can be handled as a group of analogous colors having a predetermined range concerning the chromaticity value, a capacity for correction data and correction precision can be arbitrarily controlled by adjusting the size of the chromaticity ranges. For instance, increasing the size of the chromaticity ranges enables to reduce the capacity for correction data, and decreasing the size of the chromaticity ranges enables to enhance the correction precision. Further, there is no need of preparing calibration coefficients by the number equal to the number of the pixel units corresponding to all the pixel data constituting the two-dimensional image. In other words, there is no need of multiplying the respective calibration coefficients by the pixel unit data in one-to-one correspondence, thereby enhancing the processing efficiency.

Further, a calibrator, corresponding to the external device 9, specifically, the table information generator in the external device 9, calculates the respective calibration coefficients indicated by the reference numeral 734 in FIG. 3, based on a ratio of the measurement chromaticity value corresponding to the color to be corrected, as indicated by the symbol M in FIG. 3, versus the true value corresponding to the color to be corrected, as indicated by the symbol T in FIG. 3, which is obtained by a measurement with respect to the color to be corrected by a measuring device other than the two-dimensional calorimeter 1. This enables to easily obtain the respective calibration coefficients, using the calibrator, based on the ratio of the measurement chromaticity value corresponding to the color to be corrected, versus the true value corresponding to the color to be corrected, which is obtained by the other measurement with respect to the color to be corrected.

The arbitrary calibration coefficient memory 73 stores therein the arbitrary calibration coefficient LUT 731, as a lookup table, recorded with the chromaticity range information and the calibration coefficient information which are correlated to each other with respect to each of the colors to be corrected. This enables to easily determine i.e. select a calibration coefficient by which a measurement chromaticity value belonging to the chromaticity range corresponding to a certain color to be corrected is multiplied, using the arbitrary calibration coefficient LUT 731 recorded with the chromaticity range information and the calibration coefficient information which are correlated to each other with respect to each of the colors to be corrected i.e. a data conversion table. Also, this enables to integrally record the information relating to the colors to be corrected, the discrimination chromaticity values, and the calibration coefficients in the arbitrary calibration coefficient LUT 731, which provides improved data handling, and simplifies the configuration of the two-dimensional calorimeter.

The arbitrary calibration coefficient LUT 731 is created by the calibration. The calibrator creates the arbitrary calibration coefficient LUT 731 based on information relating to the color to be corrected at a site arbitrarily designated by the user on the two-dimensional image acquired by sensing the object image to be measured, and based on the measurement chromaticity value and the true value at the site designated on the two-dimensional image. Thus, the color to be corrected is arbitrarily designated by the user on the two-dimensional image acquired by sensing the object image to be measured. This allows the user to designate plural colors to be corrected simultaneously on a single two-dimensional image. This eliminates the need of designating colors to be corrected one by one, as is required in a conventional spot-type luminance colorimeter, which improves operation efficiency and operability in arbitrary correction. Also, the arbitrary calibration coefficient LUT 731 is created based on the information relating to the color to be corrected at the site designated on the two-dimensional image, and based on the measurement chromaticity value and the true value at the designated site. Accordingly, for instance, in response to the user's arbitrarily designating a certain site on the two-dimensional image, and entering, through the monitor screen, the information relating to the color to be corrected at the designated site, and the true value of the chromaticity value at the designated site, which has been obtained by the other measurement, the arbitrary calibration coefficient LUT 731 can be automatically created based on the entered information, and the information relating to the measurement chromaticity value at the designated site on the two-dimensional image.

A white color calibration is performed as a process prior to the correction of applying the predetermined correction information corresponding to a certain color to be corrected to the two-dimensional image in terms of a pixel unit. Thus, the white color calibration is performed as the pre-process for the arbitrary correction, in addition to the arbitrary correction. This enables to reduce an error in the arbitrary correction e.g. color discrimination, thereby realizing high-precision measurement by the two-dimensional colorimeter 1.

According to the spectral sensitivity correction method in the embodiment i.e. an arbitrary correction method by the two-dimensional colorimeter 1, an object image to be measured is sensed to acquire a two-dimensional image in a sensing step, and discrimination is made as to whether a targeted color with respect to the two-dimensional image acquired in the sensing step is to be corrected in terms of a pixel unit in a discriminating step. Then, in a calculating step, a calculation is performed to apply predetermined correction information corresponding to the color to be corrected to the two-dimensional image in terms of a pixel unit, based on a discrimination result in the discriminating step.

In the above arrangement, the colors on the two-dimensional image are discriminated one from another in terms of a pixel unit. In the case where it is discriminated that data concerning e.g. a certain pixel unit is data having information relating to a certain color to be corrected, based on the discrimination result, the correction information e.g. a calibration coefficient corresponding to the color to be corrected is applied to the pixel unit data. This enables to realize the two-dimensional colorimeter 1, having high processing efficiency and high operability, which is capable of: performing an arbitrary correction with respect to plural arbitrary colors to be corrected within a common screen image i.e. the two-dimensional image, while displaying measurement results concerning the respective colors after the arbitrary correction on the common screen image, in other words, applying measurement values concerning the respective colors after the correction to a single image; completing the arbitrary correction by one-time measurement i.e. one-time image sensing in performing the arbitrary correction, in other words, obtaining an image i.e. measurement values after the arbitrary correction with respect to the colors by one-time measurement; and completing an arbitrary correction as a post-process by one-time operation, in the case where the arbitrary correction is performed after the measurement, without the need of performing the arbitrary correction by the number of times equal to the number of the colors for the arbitrary correction, in other words, completing the measurement in calibration to obtain arbitrary correction coefficients by one-time operation.

Also, in a storing step, discrimination chromaticity values for discriminating whether the targeted color is the color to be corrected, and calibration coefficients as the correction information are stored in correlation to each other. In the discriminating step, a comparison is made between measurement chromaticity values as chromaticity values on the two-dimensional image acquired in the sensing step in terms of a pixel unit, and the discrimination chromaticity values stored in the storing step. In the calculating step, the calibration coefficient corresponding to the color to be corrected is selected from the calibration coefficients stored in the storing step in accordance with a comparison result in the discriminating step to multiply the selected calibration coefficient by the respective corresponding measurement chromaticity values.

In the above arrangement, the measurement chromaticity values and the discrimination chromaticity values are compared on the two-dimensional image in terms of a pixel unit, and the calibration coefficient corresponding to the color to be corrected is multiplied by the respective corresponding measurement chromaticity values in accordance with the comparison result. This enables to easily realize an arrangement of discriminating the colors on the two-dimensional image one from another in terms of a pixel unit, and applying the correction information corresponding to the color to be corrected to the two-dimensional image in terms of a pixel unit, thereby providing the two-dimensional colorimeter 1 with high processing efficiency and operability.

To summarize the invention, a two-dimensional colorimeter according to an aspect of the invention comprises: an image sensing section, including an image sensor constituted of a number of pixels arranged in a two-dimensional manner, for sensing an object image to be measured to acquire a two-dimensional image; a discriminator for discriminating whether a targeted color with respect to the two-dimensional image acquired by the image sensing section is to be corrected in terms of a pixel or pixels; and a calculator for performing a calculation to apply predetermined correction information corresponding to the color to be corrected to the two-dimensional image in terms of a pixel or pixels, based on a discrimination result by the discriminator.

In the above-mentioned two-dimensional calorimeter, the image sensing section senses the object image to be measured to acquire the two-dimensional image, and the discriminator discriminates whether the targeted color with respect to the two-dimensional image acquired by the image sensing section is to be corrected in terms of a pixel or pixels. The calculator performs the calculation to apply the predetermined correction information corresponding to the color to be corrected to the two-dimensional image in terms of a pixel or pixels, based on the discrimination result by the discriminator.

A spectral sensitivity correcting method according to another aspect of the invention comprises steps of sensing an object image to be measured to acquire a two-dimensional image; discriminating whether a targeted color with respect to the two-dimensional image acquired in the sensing step is to be corrected in terms of a pixel or pixels; and performing a calculation to apply predetermined correction information corresponding to the color to be corrected to the two-dimensional image in terms of a pixel or pixels, based on a discrimination result in the discriminating step.

In the above-mentioned spectral sensitivity correcting method, in the sensing step, the object image to be measured is sensed to acquire the two-dimensional image, and in the discriminating step, discrimination is made as to whether the targeted color with respect to the two-dimensional image acquired in the sensing step is to be corrected in terms of a pixel or pixels. Then, in the calculating step, the calculation is performed to apply the predetermined correction information corresponding to the color to be corrected to the two-dimensional image in terms of a pixel or pixels, based on the discrimination result in the discriminating step.

In the above two-dimensional colorimeter and the above spectral sensitivity correcting method, the colors on the two-dimensional image are discriminated one from another in terms of a pixel or pixels. In the case where it is discriminated that data concerning e.g. a certain pixel unit is data having information relating to a certain color to be corrected, based on the discrimination result, the correction information e.g. a calibration coefficient corresponding to the color to be corrected is applied to the pixel unit data. This enables to realize the two-dimensional colorimeter, having high processing efficiency and high operability, which is capable of performing an arbitrary correction with respect to plural arbitrary colors to be corrected within a common screen image i.e. the two-dimensional image, while displaying measurement results concerning the respective colors after the arbitrary correction on the common screen image, in other words, applying measurement values concerning the respective colors after the correction to a single image; completing the arbitrary correction by one-time measurement i.e. one-time image sensing in performing the arbitrary correction, in other words, obtaining an image i.e. measurement values after the arbitrary correction with respect to the colors by one-time measurement; and completing an arbitrary correction as a post-process by one-time operation, in the case where the arbitrary correction is performed after the measurement, without the need of performing the arbitrary correction by the number of times equal to the number of the colors for the arbitrary correction, in other words, completing the measurement in calibration to obtain arbitrary calibration coefficients by one-time operation.

Preferably, the two-dimensional colorimeter may further comprise: a storage for storing discrimination chromaticity values for discriminating whether the targeted color is the color to be corrected, and calibration coefficients as the correction information in association with the discrimination chromaticity values, wherein the discriminator compares measurement chromaticity values as chromaticity values on the two-dimensional image acquired by the image sensing section in terms of a pixel or pixels, with the discrimination chromaticity values stored in the storage, and the calculator selects the calibration coefficient corresponding to the color to be corrected from the calibration coefficients stored in the storage in accordance with a comparison result by the discriminator to multiply the selected calibration coefficient by the measurement chromaticity value.

In the above two-dimensional colorimeter, the storage stores therein the discrimination chromaticity values, corresponding to the colors to be corrected, for discriminating whether the targeted color is the color to be corrected, and the calibration coefficients as the correction information in association with the discrimination chromaticity values. The discriminator compares the measurement chromaticity values as chromaticity values on the two-dimensional image acquired by the image sensing section in terms of a pixel or pixels, with the discrimination chromaticity values stored in the storage. Then, the calculator selects the calibration coefficient corresponding to the color to be corrected from the calibration coefficients stored in the storage in accordance with a comparison result by the discriminator to multiply the selected calibration coefficient by the measurement chromaticity value.

Preferably, the spectral sensitivity correcting method may further comprise: a step of storing discrimination chromaticity values for discriminating whether the targeted color is the color to be corrected, and calibration coefficients as the correction information in association with the discrimination chromaticity values, wherein in the discriminating step, a comparison is made between measurement chromaticity values as chromaticity values on the two-dimensional image acquired in the sensing step in terms of a pixel or pixels, and the discrimination chromaticity values stored in the storing step, and in the calculating step, the calibration coefficient corresponding to the color to be corrected is selected from the calibration coefficients stored in the storing step in accordance with a comparison result in the discriminating step to multiply the selected calibration coefficient by the measurement chromaticity value.

According to the above spectral sensitivity correcting method, in the storing step, the discrimination chromaticity values for discriminating whether the targeted color is the color to be corrected, and the calibration coefficients as the correction information are stored in association with the discrimination chromaticity values. In the discriminating step, the comparison is made between the measurement chromaticity values as chromaticity values on the two-dimensional image acquired in the sensing step in terms of a pixel or pixels, and the discrimination chromaticity values stored in the storing step. In the calculating step, the calibration coefficient corresponding to the color to be corrected is selected from the calibration coefficients stored in the storing step in accordance with the comparison result in the discriminating step to multiply the selected calibration coefficient by the measurement chromaticity value.

In the above two-dimensional colorimeter and the above spectral sensitivity correcting method, the measurement chromaticity values and the discrimination chromaticity values are compared on the two-dimensional image in terms of a pixel or pixels, and the calibration coefficient corresponding to the color to be corrected is multiplied by the measurement chromaticity value in accordance with the comparison result. This enables to easily realize an arrangement of discriminating the colors on the two-dimensional image one from another in terms of a pixel or pixels, and applying the correction information corresponding to the color to be corrected to the two-dimensional image in terms of a pixel or pixels, thereby providing the two-dimensional calorimeter with high processing efficiency and operability.

Preferably, the discrimination chromaticity values may be information relating to chromaticity ranges each having a predetermined range concerning the chromaticity value. With this arrangement, the discrimination chromaticity values serve as the information relating to chromaticity ranges each having the predetermined range concerning the chromaticity value.

The above arrangement enables to handle the measurement chromaticity values, on the two-dimensional image, which belong to a certain chromaticity range, as the same color to be corrected in color discrimination, i.e., to apply the same calibration coefficient to the measurement chromaticity values within the certain chromaticity range. In other words, since a certain color to be corrected can be handled as a group of analogous colors having a predetermined range concerning the chromaticity value, a capacity for correction data and correction precision can be arbitrarily controlled by adjusting the size of the chromaticity ranges. For instance, increasing the size of the chromaticity ranges enables to reduce the capacity for correction data, and decreasing the size of the chromaticity ranges enables to enhance the correction precision.

Preferably, the two-dimensional calorimeter may further comprise a calibrator for calculating the respective calibration coefficients based on a ratio of the measurement chromaticity value corresponding to the color to be corrected versus a true value obtained by a measurement with respect to the color to be. corrected by a measuring device other than the two-dimensional calorimeter. In this arrangement, the calibration coefficient is calculated by the calibrator based on the ratio of the measurement chromaticity value corresponding to the color to be corrected versus the true value obtained by the other measurement with respect to the color to be corrected.

The above arrangement enables to easily obtain the calibration coefficient, using the calibrator, based on the ratio of the measurement chromaticity value corresponding to the color to be corrected, versus the true value obtained by the other measurement with respect to the color to be corrected.

Preferably, the storage may store therein a lookup table recorded with the chromaticity range information and the correction information which are correlated to each other with respect to each of the colors to be corrected. In this arrangement, the storage stores the lookup table recorded with the chromaticity range information and the correction information which are correlated to each other with respect to each of the colors to be corrected.

The above arrangement enables to easily determine i.e. select a calibration coefficient by which a measurement chromaticity value belonging to the chromaticity range corresponding to a certain color to be corrected is multiplied, using the lookup table recorded with the chromaticity range information and the calibration coefficient information which are correlated to each other with respect to each of the colors to be corrected i.e. a data conversion table. Also, this enables to integrally record the information relating to the colors to be corrected, the discrimination chromaticity values, and the calibration coefficients in the lookup table, which provides improved data handling, and simplifies the configuration of the two-dimensional colorimeter.

Preferably, the lookup table may be created by a calibrator, and the calibrator may create the lookup table based on information relating to the color to be corrected at a site arbitrarily designated by a user on the two-dimensional image acquired by sensing the object image to be measured, and based on the measurement chromaticity value and a true value at the site designated on the two-dimensional image. In this arrangement, the lookup table is created by the calibrator. The calibrator creates the lookup table based on the information relating to the color to be corrected at the site arbitrarily designated by the user on the two-dimensional image acquired by sensing the object image to be measured, and based on the measurement chromaticity value and the true value at the site designated on the two-dimensional image.

With the above arrangement, the color to be corrected is arbitrarily designated by the user on the two-dimensional image acquired by sensing the object image to be measured. This allows the user to designate plural colors to be corrected simultaneously on a single two-dimensional image. This eliminates the need of designating colors to be corrected one by one, as is required in a conventional spot-type luminance colorimeter, which improves operation efficiency and operability in arbitrary correction. Also, the lookup table is created based on the information relating to the color to be corrected at the site designated on the two-dimensional image, and based on the measurement chromaticity value and the true value at the designated site. With this arrangement, for instance, in response to the user's arbitrarily designating a certain site on the two-dimensional image, and entering, through the monitor screen, the information relating to the color to be corrected at the designated site, and the true value of the chromaticity value at the designated site which has been obtained by the other measurement, the lookup table can be automatically created based on the entered information, and the information relating to the measurement chromaticity value at the designated site on the two-dimensional image.

Preferably, a white color calibration may be performed as a process prior to the calculation of applying the predetermined correction information corresponding to the color to be corrected to the two-dimensional image in terms of a pixel or pixels. In this arrangement, the white color calibration is performed as the pre-process for the correction of applying the predetermined correction information corresponding to the color to be corrected to the two-dimensional image in terms of a pixel or pixels.

With the above arrangement, the white color calibration is performed as the pre-process for the arbitrary correction, in addition to the arbitrary correction. This enables to reduce an error in the arbitrary correction e.g. color discrimination, thereby realizing high-precision measurement by the two-dimensional colorimeter.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A two-dimensional colorimeter comprising:
   an image sensing section, including an image sensor constituted of a number of pixels arranged in a two-dimensional manner, for sensing an object image to be measured to acquire a two-dimensional image;
   a discriminator for discriminating whether a targeted color with respect to the two-dimensional image acquired by the image sensing section is to be corrected in terms of a pixel or pixels;
   a calculator for performing a calculation to apply predetermined correction information corresponding to the color to be corrected to the two-dimensional image in terms of a pixel or pixels, based on a discrimination result by the discriminator; and
   a storage for storing discrimination chromaticity values for discriminating whether the targeted color is the color to be corrected, and calibration coefficients as the correction information in association with the discrimination chromaticity values, wherein the discrimination chromaticity values are information relating to chromaticity ranges each having a predetermined range concerning the chromaticity value,
   the discriminator compares measurement chromaticity values as chromaticity values on the two-dimensional image acquired by the image sensing section in terms of a pixel or pixels, with the discrimination chromaticity values stored in the storage, and
   the calculator selects the calibration coefficient corresponding to the color to be corrected from the calibration coefficients stored in the storage in accordance with a comparison result by the discriminator to multiply the selected calibration coefficient by the measurement chromaticity value.

2. The two-dimensional colorimeter according to claim 1, further comprising a calibrator for calculating the respective calibration coefficients based on a ratio of the measurement chromaticity value corresponding to the color to be corrected versus a true value obtained by a measurement with respect to the color to be corrected by a measuring device other than the two-dimensional colorimeter.

3. The two-dimensional colorimeter according to claim 1, wherein
   the storage stores therein a lookup table recorded with chromaticity range information and the correction information which are correlated to each other with respect to each of the colors to be corrected.

4. The two-dimensional colorimeter according to claim 3, wherein
   the lookup table is created by a calibrator, and
   the calibrator creates the lookup table based on information relating to the color to be corrected at a site arbitrarily designated by a user on the two-dimensional image acquired by sensing the object image to be measured, and based on the measurement chromaticity value and a true value at the site designated on the two-dimensional image.

5. The two-dimensional colorimeter according to claim 1, wherein
   a white color calibration is performed as a process prior to the calculation of applying the predetermined correction information corresponding to the color to be corrected to the two-dimensional image in terms of a pixel or pixels.

6. A two-dimensional colorimeter comprising:
   an image sensing section, including an image sensor constituted of a number of pixels arranged in a two-dimensional manner, for sensing an object image to be measured to acquire a two-dimensional image;
   a discriminator for discriminating whether a targeted color with respect to the two-dimensional image acquired by the image sensing section is to be corrected in terms of a pixel or pixels;
   a calculator for performing a calculation to apply predetermined correction information corresponding to the color to be corrected to the two-dimensional image in terms of a pixel or pixels, based on a discrimination result by the discriminator;
   a storage for storing discrimination chromaticity values for discriminating whether the targeted color is the color to be corrected, and calibration coefficients as the correction information in association with the discrimination chromaticity values, wherein
   the discriminator compares measurement chromaticity values as chromaticity values on the two-dimensional image acquired by the image sensing section in terms of a pixel or pixels, with the discrimination chromaticity values stored in the storage, and
   the calculator selects the calibration coefficient corresponding to the color to be corrected from the calibration coefficients stored in the storage in accordance with a comparison result by the discriminator to multiply the selected calibration coefficient by the measurement chromaticity value; and
   a calibrator for calculating the respective calibration coefficients based on a ratio of the measurement chromaticity value corresponding to the color to be corrected versus a true value obtained by a measurement with respect to the color to be corrected by a measuring device other than the two-dimensional colorimeter.

7. The two-dimensional colorimeter according to claim 6, wherein
   the discrimination chromaticity values are information relating to chromaticity ranges each having a predetermined range concerning the chromaticity value.

8. The two-dimensional colorimeter according to claim 6, wherein
   the storage stores therein a lookup table recorded with chromaticity range information and the correction information which are correlated to each other with respect to each of the colors to be corrected.

9. The two-dimensional colorimeter according to claim 8, wherein the lookup table is created by a calibrator, and the calibrator creates the lookup table based on information relating to the color to be corrected at a site arbitrarily designated by a user on the two-dimensional image acquired by sensing the object image to be measured, and based on the measurement chromaticity value and a true value at the site designated on the two-dimensional image.

10. The two-dimensional colorimeter according to claim 6, wherein a white color calibration is performed as a process prior to the calculation of applying the predetermined correction information corresponding to the color to be corrected to the two-dimensional image in terms of a pixel or pixels.

11. A two-dimensional colorimeter comprising:

an image sensing section, including an image sensor constituted of a number of pixels arranged in a two-dimensional manner, for sensing an object image to be measured to acquire a two-dimensional image;

a discriminator for discriminating whether a targeted color with respect to the two-dimensional image acquired by the image sensing section is to be corrected in terms of a pixel or pixels;

a calculator for performing a calculation to apply predetermined correction information corresponding to the color to be corrected to the two-dimensional image in terms of a pixel or pixels, based on a discrimination result by the discriminator; and a storage for storing discrimination chromaticity values for discriminating whether the targeted color is the color to be corrected, and calibration coefficients as the correction information in association with the discrimination chromaticity values, wherein the storage stores therein a lookup table created by the calibrator and recorded with chromaticity range information and the correction information which are correlated to each other with respect to each of the colors to be corrected, the calibrator creates the lookup table based on information relating to the color to be corrected at a site arbitrarily designated by a user on the two-dimensional image acquired by sensing the object image to be measured, and based on the measurement chromaticity value and a true value at the site designated on the two-dimensional image, the discriminator compares measurement chromaticity values as chromaticity values on the two-dimensional image acquired by the image sensing section in terms of a pixel or pixels, with the discrimination chromaticity values stored in the storage, and the calculator selects the calibration coefficient corresponding to the color to be corrected from the calibration coefficients stored in the storage in accordance with a comparison result by the discriminator to multiply the selected calibration coefficient by the measurement chromaticity value.

12. The two-dimensional colorimeter according to claim 11, wherein the discrimination chromaticity values are information relating to chromaticity ranges each having a predetermined range concerning the chromaticity value.

13. The two-dimensional colorimeter according to claim 11, further comprising a calibrator for calculating the respective calibration coefficients based on a ratio of the measurement chromaticity value corresponding to the color to be corrected versus a true value obtained by a measurement with respect to the color to be corrected by a measuring device other than the two-dimensional colorimeter.

14. The two-dimensional colorimeter according to claim 11, wherein a white color calibration is performed as a process prior to the calculation of applying the predetermined correction information corresponding to the color to be corrected to the two-dimensional image in terms of a pixel or pixels.

15. A two-dimensional colorimeter comprising:

an image sensor having a plurality of pixels arranged in a two-dimensional configuration and which is adapted to sense an object image and acquire a two-dimensional image of the object;

a comparator which is configured to discriminate whether a targeted color with respect to the two-dimensional image acquired by the image sensor is to be corrected in terms of a pixel or pixels;

a multiplier configured to apply predetermined correction information corresponding to the color to be corrected to the two-dimensional image in terms of a pixel or pixels, based on a discrimination result by the comparator;

a memory which is configured to store discrimination chromaticity values for discriminating whether the targeted color is the color to be corrected, and calibration coefficients as the correction information in association with the discrimination chromaticity values, the discrimination chromaticity values being information relating to chromaticity ranges each having a predetermined range concerning the chromaticity value, wherein the comparator is configured to compare measurement chromaticity values as chromaticity values on the two-dimensional image acquired by the image sensing section in terms of a pixel or pixels, with the discrimination chromaticity values stored in the memory, and the multiplier is configured to select the calibration coefficient corresponding to the color to be corrected from the calibration coefficients stored in the memory in accordance with a comparison result by the comparator to multiply the selected calibration coefficient by the measurement chromaticity value.

16. A method of operating a two-dimensional colorimeter having an image sensing section, including an image sensor constituted of a number of pixels arranged in a two-dimensional manner, for sensing an object image to be measured to acquire a two-dimensional image, said method comprising the steps of:

discriminating whether a targeted color with respect to a two-dimensional image acquired by the image sensing section is to be corrected in terms of a pixel or pixels;

performing a calculation to apply predetermined correction information corresponding to the color to be corrected to the two-dimensional image in terms of a pixel or pixels, based on a discrimination result;

storing discrimination chromaticity values for discriminating whether the targeted color is the color to be corrected, and calibration coefficients as the correction information in association with the discrimination chromaticity values, the step of discriminating including comparing measurement chromaticity values as chromaticity values on the two-dimensional image in terms of a pixel or pixels, with the stored discrimination chromaticity values, and calculating the respective calibration coefficients based on a ratio of the measurement chromaticity value corresponding to the color to be corrected versus a true value obtained by a measurement with respect to the color to be corrected by a measuring device other than the two-dimensional colorimeter, the step of calculating including selecting the calibration coefficient corresponding to the color to be corrected from the stored calibration coefficients in accordance with a comparison result from the step of discriminating to correct the measurement chromaticity value using the selected calibration coefficient.

* * * * *